May 27, 1969     W. D. MOORE     3,446,274
GAS TURBINE EXHAUST SYSTEM
Filed Oct. 9, 1967
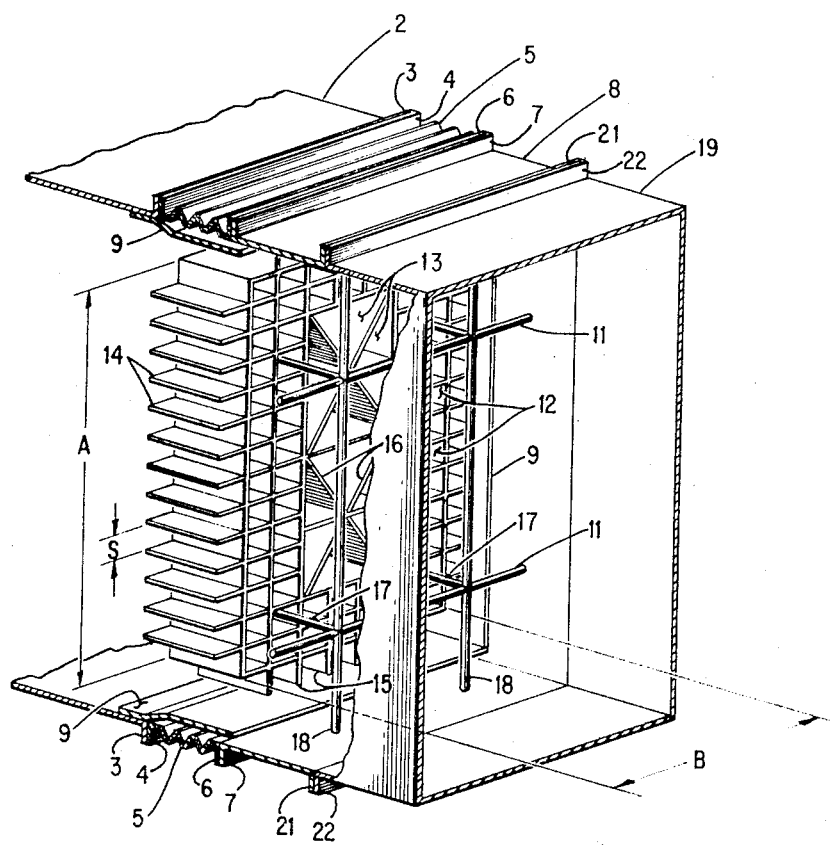
INVENTOR
WILLIAM D. MOORE
BY *John J. Freer*
ATTORNEY

United States Patent Office 3,446,274
Patented May 27, 1969

3,446,274
GAS TURBINE EXHAUST SYSTEM
William D. Moore, 1904 Zapp Lane,
Pasadena, Tex. 77502
Filed Oct. 9, 1967, Ser. No. 673,775
Int. Cl. F28f 7/00; F28b 9/00
U.S. Cl. 165—83                                             2 Claims

ABSTRACT OF THE DISCLOSURE

Gas turbines, such as used in the generation of electricity, are made more efficient by using the hot turbine exhaust gases to drive a heat exchanger. In the ductwork from the turbine to the heat exchanger, a flexible joint provides essential freedom to the thermal movements of the turbine without the heat exchanger exerting substantial force or weight on the turbine. Positioned at about the zone of the flexible joint, a rigid honeycombed straightening vane within the ductwork imparts extended operating life to the flexible joint and provides enhanced turbine efficiency and mechanical performance.

Background of the invention

Commercially available gas turbines such as those used for the production of electricity are produced for installation as a packaged unit, that is, without modification of the components of the turbine after manufacture. This requirement is dictated by the complex force system inherent in the operation of the turbine. This system includes, for example, the rotational forces accompanying the turning of the turbine shaft, the force exerted by the weight of the turbine exhaust duct, the back pressure exerted on the turbine due to the resistance of the gas flow in the downstream ductwork, and the turning moment from the unevenly distributed flow of exhaust gas in the turbine exhaust duct.

Although the exhaust duct is positioned substantially transverse to the turbine shaft, the curvature of the turbine blades results in the discharge of exhaust gases at an angle to such shaft. This leads to an unevenly distributed gas flow in the exhaust duct, i.e., provides the above-mentioned turning moment on the turbine. These forces are taken into account during the design of the turbine, and after manufacture of the turbine modifications or a redesigning of the turbine such as accompanying relocation of the exhaust duct are costly and can result in a reduction in turbine operating efficiency. Hence, problems arising downstream from the turbine exhaust must be handled without a change in the structure of the turbine as manufactured.

In the downstream ductwork, hot exhaust gases drive a heat exchanger for maximum overall turbine efficiency. Since the weight of the heat exchanger must not exert significant force upon the turbine, the ductwork between the turbine and the heat exchanger contains a flexible joint. The flexible joint permits the turbine to freely move in a vertical, horizontal or rotational plane as the turbine operates from a "cold condition," that is, shutdown, to a hot condition, i.e., running. By permitting the turbine to freely move, external forces upon the turbine are maintained within the limits of turbine design and thus the flexible joint provides for enhanced continuous operation, and mechanical performance of the turbine.

However, during turbine operation the flexible joint has an extremely short operating life, e.g., metal reinforced asbestos joints usually are gas-tight for a month or less and generally need replacing in about three to six months. These somewhat rigid materials are required in construction of the joint because of the temperatures attained by the exhaust gases. In addition to the vibration provided by the turbine and any gas turbulence at the flexible joint, it has now been found that there is a pressure imbalance in the gas around the flexible joint, apparently arising from the unevenly distributed exhaust gas flow discussed hereinbefore. It is believed that this imbalance of pressure is the underlying factor in a pulsating vibration, which is readily observed at the flexible joint, and which is extremely deleterious to the useful life of the joint.

Owing to the accordion pleated construction of the joint, which insures flexibility, any gas turbulence at the joint is augmented as the gas flows over the pleats. Thus it has been the practice to shroud the joint by a strip of metal across the joint. This metal strip, or "shroud," must be fastened at the upstream or turbine side of the ductwork, or leading upstream edge of the joint, to direct gases over the joint and out of contact with the pleats. The shroud must be attached across the joint to permit flexibility of the joint, and must be sufficiently rigid so that it will not augment gas turbulence.

Lengthening the shroud, i.e., extending it into the ductwork in the direction of the heat exchanger, was suggested for extending the useful life of the joint. In actual practice, however, although possibly reducing any gas turbulence within the ductwork downstream from the joint, the longer shroud did not noticeably extend the operating life of the flexible joint and thus did not ostensibly effect a significant change in the above mentioned pressure imbalance. Moreover, since the length of the shroud added further weight to the exhaust duct of the turbine, this intensified the bending moment exerted by the exhaust duct on the turbine and impeded mechanical performance of the turbine.

It was thus proposed to install a screen within the ductwork to essentially modify any gas turbulence at the location of the flexible joint. In operation, however, a screen proved ineffective for extending joint life. Furthermore, the screen imposed a back pressure on the turbine through the exhaust gases which retarded the operating efficiency of the turbine. Any apparatus extending the life of the joint but substantially enhancing back pressure on the turbine, or causing a deflection in the main shaft of the turbine, sacrificed turbine efficiency and mechanical performance.

It was also suggested that deflecting vanes, similar in shape to the turbine buckets, be placed just downstream from the turbine in the exhaust duct, but in a position reversed to the vanes of the turbine blades. These vanes might sufficiently redirect the exhaust gases to distribute their flow in a direction substantially transverse to the axis of the turbine. However, such deflection vanes would create a twisting thrust on the turbine, exerted back through the turbine ductwork, and require a new design for the turbine to maintain turbine efficiency. Therefore the installation of such vanes was impractical.

Summary of the invention

Broadly, the present invention provides within the turbine ductwork a rigid honeycombed straightening vane positioned to occupy virtually an entire cross-sectional area of the ductwork, for a short distance along the length of the ductwork, including substantially all to all of the ductwork length taken up by the flexible joint. The vane is positioned to be free from contact with both the portion of the ductwork upstream from the flexible joint and the shroud around the flexible joint.

Although such a straightening vane has been employed before to reduce gas turbulence, the installation in the present invention retards the imbalance of pressure around the flexible joint. This can be observed as a reduction to elimination of the above-mentioned pulsating vibration apparent at the joint prior to installation of the vane.

In addition to extending the operating life of the flexible joint the honeycombed straightening vane, within a very short distance, apparently divides the total gas flow leaving the turbine into a number of smaller gas flows which division, combined with the method of supporting the vane, leads to a shift in the forces presented by the ductwork air flow, away from the gas turbine and onto the downstream exhaust duct. The vane adds significantly to the bulk of the apparatus contained within the ductwork; this would seemingly act to restrict the free flow of exhaust gas issuing down the duct, therefore increasing the back pressure on the turbine. However, it has been found in practice that the straightening vane actually suppresses, rather than increasing, the back pressure on the turbine. Hence as an additional benefit, the straightening vane enhances the operating efficiency of the turbine or, in other words, provides for a reduced pressure drop along the ductwork and a maximum power generation for the turbine.

Moreover, the honeycombed straightening vane is simply constructed and easily installed. It is readily supported by the downstream ductwork and therefore does not contribute to the weight of the turbine exhaust duct. Further, the efficiency of the vane is not ostensibly affected by differential thermal expansion of the vane, i.e., a more elevated heating of only a portion of the vane accompanying an unevenly distributed flow of hot turbine exhaust gas.

*Brief description of the drawing*

The attached drawing shows a cut-away perspective view of turbine exhaust ductwork containing a rigid honeycombed straightening vane.

*Description of the preferred embodiments*

Referring to the drawing, an upstream rectangular exhaust duct 2 leading from a turbine, not shown, terminates at an end flange 3 fastened to a leading flanged portion 4 of a flexible expansion joint. Along the length of the ductwork the flexible joint has an accordion pleated, flexible section 5. The downstream flange 6 of the flexible joint is fastened to the upstream flanged portion 7 of a removable first duct 8, which duct 8 is part of the overall downstream ductwork. This first duct 8 facilitates installation of apparatus within the ductwork. Thus the flexible expansion joint from the leading flanged portion 4 downstream through the flange 6 forms a connecting zone between the upstream exhaust duct 2 and the downstream ductwork first duct 8.

The downstream flange 21 of the first duct 8 of the downstream ductwork is in turn fastened to the upstream flange 22 of an exhaust duct 19 which is a continuing part of the downstream ductwork and leads to a heat exchanger, not shown. A rigid metal shroud 9 secured around and within the upstream exhaust duct 2 extends downstream over the accordion pleated sections 5 of the expansion joint and into the first duct 8 and is spaced apart from these accordion pleated sections 5 and the first duct 8.

Extending almost to the forward flange 4 of the flexible joint, is a honeycombed straightening vane having peripheral, narrow channels 12 and interior, more open channels 13. The peripheral channels 12 are provided by substantially horizontal vane members 14 and substantially vertical vane members 15. These vane members 14, 15 extend around the periphery of the vane almost completely to the shroud 9. The interior open channels 13 contain crossed support plates 16 which prevent any flattening of the rigid straightening vane during use, i.e., any deviation in the configuration of the vane in a direction transverse to the axis of the ductwork. Horizontal support bars 17 extend from horizontal vane members 14 and are secured at their opposite end to upright support stanchions 18. The stanchions 18 in turn are firmly affixed to the inner faces of the upper and lower portion of the rectangular intermediate duct 8 and are braced by supporting cross bars 11. The totally enclosed square end faces of the narrow channels 12 have sides of dimension S, and collectively form a rectangular shaped end area for the vane having a height A and a width B. These dimensions will be referred to in more detail hereinafter in connection with mathematical formulas.

In addition to the configuration shown for the straightening vane a part to all of the vane can have channels of hexagonal configuration or the squares as shown in the figure can be staggered rather than in alignment or can be tipped on their axis to provide rhombic shaped channels. Also, the channels can be continued across the entire face of the vane to more narrowly channel the center section shown in the figure and cross bars, offering support against flattening of the vane, can be provided on the exterior faces of the vane. For any configuration, the entire straightening vane preferably occupies virtually a complete sectional area of the ductwork.

The shroud should be sufficiently rigid so that it does not contact either the flexible joint or the vane, to avoid putting any mechanical force on the turbine. The supporting structure for the vane should be secured to the portion of the ductwork downstream from the flexible point, to avoid adding weight to the turbine exhaust duct. That is, the vane should be entirely free from contact with the upstream duct. The downstream duct should be in substantial alignment with the upstream duct, but can be slightly angled horizontally and/or vertically with respect to the upstream duct. The straightening vane can be suitably constructed from any refractory material, such as ceramic materials, but for ease of fabrication is preferably metallic.

In a typical application of a straightening vane of the present invention, a turbine discharges 750,000 pounds per hour of exhaust gases at a temperature of about 800° F. into an off-gas duct. To achieve maximum power from the turbine, not more than 6 inches static back pressure can be tolerated at the turbine exhaust duct. Both the upstream duct and downstream duct are about 5½′ x 10′ (5½ feet by 10 feet) in cross-section and the upstream section has a length of 4′3″ from turbine shaft to flexible joint. The downstream section from flexible joint to heat exchanger has a length of 14 feet.

The flexible joint is about 9½ inches long and is constructed from an asbestos yarn reinforced with stainless steel wire and impregnated with a heat resistant substance to provide temperature resistance for the joint of up to 1100° F. The metal shroud extending across the flexible joint is fastened to the downstream, flanged end of the upstream duct and extends for about 23 inches along the length of the ductwork.

The vertical stanchions for supporting the straightening vane are fabricated from 3-inch pipe and are located 2′11″ downstream from the leading edge of the expansion joint. Two cross bars of 2-inch pipe are securely fastened to the stanchions to support forward projecting arms secured to the straightening vane. The largest rectangular area of the straightening vane has an overall dimension of 8′3¾″ x 49⅞″ and the vane has a depth along the ductwork of 21″. The straightening vane is constructed entirely from Type 304 stainless steel and the leading upstream face of the vane is set back 1⅜″ from the end flange, downstream from the turbine, of the upstream exhaust duct. Individual peripheral channels within the vane are about 7″ x 7″ and the interior section containing supporting cross bars measured about 21″ x 70″.

Prior to installation of the straightening vane the flexible expansion joint has a useful operating life before initial gas leakage of about one month and a total operating life before complete failure of about three to six months. After the installation of the straightening vane, the expansion joint provides leak-free service for 7 months and has a projected total useful life of about 18 months.

Also, prior to installation the back pressure exerted through the discharging gas onto the turbine is 4.8 inches, well within the 6 inch limitation set for maximum efficient turbine operation. But after the installation of the straightening vane, the back pressure is reduced to 3.65 inches, thereby augmenting the available expansion for the gases within the turbine and consequently enhancing the efficiency of the turbine.

Prior to installation of the vane, an electronic vibration analyzer was employed to measure the vibration of the turbine rotor by vibration analysis at the support bearings of the rotor. After checking frequency of vibration as well as amplitude of the vibration, it was determined that the rotor would need to be balanced in place to obtain retarded vibrational amplitudes within design tolerances, and hence achieve extended rotor operating life. However, prior to such balancing operation, the straightening vane was installed in the downstream ductwork, and thereafter, as an unanticipated benefit, subsequent vibration analysis showed that the vibration tolerances for the rotor were below the design-specified limits, thereby obviating any rotor balancing to achieve maximum rotor life.

Although not meaning to be bound to any particular theory, it appears that the dimensions for the honeycombed type straighteners used to nullify spiral gas flow are especially suitable for use with the vanes in the present invention. Such dimensions for the honeycombed straighteners have been set forth, for example, at pages 75–76 in the 6th edition (1961) of Fan Engineering, by the Buffalo Forge Co., edited by Robert Jorgenson.

More specifically, the dimensions of the straighteners are satisfied by the following equations:

$$S = (7.5\% \text{ to } 15\%) \frac{A+B}{2}$$

$$S = (7.5\% \text{ to } 15\%) D$$

and $$L = 3S$$

Referring to the first equation, and to the drawing, the quantity S is the length of a side for the square faces found at the ends of the square channels, such as have been shown in the drawing. As also depicted in the drawing, the quantities A and B represent the height and width respectively of the largest rectangular area formed by the square faced ends of the channels. In addition to the conventional rectangular area shown in the drawing such area can be a square area, rhombic area, or like shape.

When the perimeter of the ductwork around the vane is substantially circular in shape, and thus the duct itself is substantially circular, the second equation above is employed. The quantity S remains the same and D is the diameter of the largest substantially circular area formed by the square faced ends of the channels. When either of the first two equations are used, the length of the straightening vane along the length of the ductwork, is represented by the quantity L.

In the above discussed typical installation of a straightening vane of the present invention, the largest enclosed rectangular area for the channeled ductwork has a mean side of 74 13/16", i.e., the height of 8'3¾" plus the width of 49⅞" divided by two. The 7 inch channel sides are thus about 9.36 percent of the mean side, which is well within the limitation set forth in the above equation of 7.5 percent to 15 percent. Additionally the 21 inch vane length along the ductwork corresponds to three times the channel side.

It is to be understood that the invention is not limited by the embodiments described hereinabove, but includes such changes and modifications as may be apparent to one skilled in the art upon reading the appended claims.

I claim:

1. In the exhaust ductwork of a gas turbine comprising an upstream exhaust duct for removing turbine gaseous discharge in a direction substantially transverse to the axis of said turbine, a heat exchanger in a downstream exhaust duct, said downstream duct being positioned in substantial alignment with said upstream duct, and a connecting zone between said upstream and downstream exhaust ducts, said zone containing a flexible, gas-tight joint and a shroud, around and within said joint for suppressing joint-induced gas turbulence, the improvement which comprises a rigid honeycombed straightening vane within said ductwork and positioned for occupying virtually an entire cross-sectional area of said ductwork, for a short distance along the length of said ductwork, including substantially all to completely all of the distance of said connecting zone, said vane being further positioned for freedom from contact with both said upstream duct and said shroud.

2. The exhaust ductwork of claim 1 wherein the straightening vane contains a multitude of channels of essentially uniform length positioned around the periphery of a substantially open supporting portion of said vane, wherein the channels have a square face at each channel end, and the overall dimensions of said straightening vane are substantially satisfied by the following equations:

$$S = (7.5\% \text{ to } 15\%) \frac{A+B}{2}$$

$$S = (7.5\% \text{ to } 15\%) D$$

and $$L = 3S$$

wherein S is the length of a side for said square faces; A and B represent the height and width respectively of the largest substantially rectangular area formed by said faces at either end of said vane when the perimeter of the ductwork around said vane exhibits substantially rectangular shape; D is the diameter of the largest substantially circular area formed at either end of said vane by said faces when the perimeter of the ductwork around said vane exhibits a substantially circular shape; and L is the length of said channels along the length of said ductwork.

References Cited

UNITED STATES PATENTS 1,781,108  11/1930  Grace _____ 165—83

ROBERT A. O'LEARY, *Primary Examiner.*

CHARLES SUKALO, *Assistant Examiner.*

U.S. Cl. X.R.

60—95; 165—111, 186

UNITED STATES PATENT OFFICE
CERTIFICATE OF CORRECTION

Patent No. 3,446,274                              May 27, 1969

William D. Moore

It is certified that error appears in the above identified patent and that said Letters Patent are hereby corrected as shown below:

In the heading to the printed specification, lines 3 and 4, "William D. Moore, 1904 Zapp Lane, Pasadena, Tex. 77502" should read -- William D. Moore, Pasadena, Tex., assignor to Diamond Shamrock Corporation, a corporation of Delaware --.

Signed and sealed this 24th day of March 1970.

(SEAL)
Attest:

Edward M. Fletcher, Jr.                      WILLIAM E. SCHUYLER, JR.
Attesting Officer                               Commissioner of Patents